(12) United States Patent
Gotsch

(10) Patent No.: US 12,228,226 B1
(45) Date of Patent: Feb. 18, 2025

(54) HYGIENIC CLAMP WITH POSITION FEEDBACK

(71) Applicant: Tourgee & Associates, Inc., Owings Mills, MD (US)

(72) Inventor: Wayne Andrew Gotsch, Marriottsville, MD (US)

(73) Assignee: Tourgee & Associates, Inc., Owings Mills, MD (US)

( * ) Notice: Subject to any disclaimer, the term of this patent is extended or adjusted under 35 U.S.C. 154(b) by 0 days.

(21) Appl. No.: 18/757,150

(22) Filed: Jun. 27, 2024

Related U.S. Application Data

(60) Provisional application No. 63/555,568, filed on Feb. 20, 2024.

(51) Int. Cl.
*F16L 23/00* (2006.01)
*F16L 23/10* (2006.01)

(52) U.S. Cl.
CPC .............. *F16L 23/006* (2013.01); *F16L 23/10* (2013.01); *F16L 2201/10* (2013.01)

(58) Field of Classification Search
CPC ......... F16L 23/006; F16L 23/10; F16L 23/04; F16L 17/04; F16L 21/065; F16L 33/12; F16L 2201/30
See application file for complete search history.

(56) References Cited

U.S. PATENT DOCUMENTS

| | | | | |
|---|---|---|---|---|
| 2,689,141 A * | 9/1954 | Kiekhaefer | ............. | F16L 23/10 285/410 |
| 3,563,571 A * | 2/1971 | Werra | ...................... | F16L 23/10 285/41 |
| 3,966,240 A * | 6/1976 | Enomoto | ................ | F16L 23/10 285/422 |
| 4,568,115 A * | 2/1986 | Zimmerly | ............... | F16L 23/10 285/411 |
| 5,837,180 A * | 11/1998 | Linder | ..................... | F16L 23/10 285/285.1 |
| 6,234,545 B1 * | 5/2001 | Babuder | .................. | F16L 23/10 285/364 |
| 2002/0109355 A1* | 8/2002 | Elliott | ...................... | F16L 23/10 285/410 |

(Continued)

FOREIGN PATENT DOCUMENTS

DE 10155362 A1 * 6/2003 ............. F16L 23/10
DE 102010032575 A1 * 2/2012 ............ F16L 23/006

(Continued)

*Primary Examiner* — Matthew Troutman
*Assistant Examiner* — Fannie Kee
(74) *Attorney, Agent, or Firm* — Wolf, Greenfield & Sacks, P.C.

(57) ABSTRACT

This application relates to a hygienic clamp with a non-contact sensor. The clamp may also include a first clamp arm, a second clamp arm, and a hinge to movably join the first clamp arm and the second clamp arm. The non-contact sensor can sense whether the clamp is closed by detecting the proximity of one arm of the clamp to its other arm, without requiring the two arms to contact one another. Since the non-contact sensor is not mechanical, no mechanical wear is produced. It is constructed to prevent build-up that can occur with other types of sensors in industries that use clamps in their applications.

20 Claims, 11 Drawing Sheets

(56) References Cited

U.S. PATENT DOCUMENTS

| | | | |
|---|---|---|---|
| 2005/0275557 A1* | 12/2005 | Newberg | F16L 23/10 340/693.9 |
| 2012/0126534 A1* | 5/2012 | Morton | F16L 23/10 285/365 |
| 2020/0085689 A1* | 3/2020 | Pizzi | F16L 23/10 |

FOREIGN PATENT DOCUMENTS

| | | | | | |
|---|---|---|---|---|---|
| JP | 2005042740 | A | * | 2/2005 | ............. F16L 23/10 |
| KR | 101583597 | B1 | * | 1/2016 | ............. F16L 23/10 |
| KR | 101734842 | B1 | * | 5/2017 | ............. F16L 23/10 |
| KR | 20240047673 | A | * | 4/2024 | ............. F16L 23/10 |

* cited by examiner

HYGIENIC CLAMP WITH POSITION FEEDBACK

RELATED APPLICATIONS

This application claims the benefit under 35 U.S.C. § 119 (e) of U.S. Provisional Application Ser. No. 63/555,568, filed Feb. 20, 2024, and titled "HYGIENIC CLAMP WITH POSITION FEEDBACK," which is hereby incorporated herein by reference in its entirety.

BACKGROUND

Clamps may be used in hygienic applications such as the pharmaceutical, life science, food and beverage, dairy, and chemical industries. Clamps can be used to secure two fittings to mechanically join pipes, valves and/or other fittings.

SUMMARY OF INVENTION

In accordance with the disclosed subject matter, apparatus, systems, and methods are provided for a hygienic clamp with position feedback.

Some embodiments are directed to a clamp including a first clamp arm with a first end and a second end. The first end may include a non-contact sensor, and the second end may be adjacent to a hinge. The clamp may also include a second clamp arm with a third end and a fourth end. The third end may be removably joined to the first end. The fourth end may be adjacent to the hinge such that the first clamp arm and the second clamp arm can move with respect to each other by the hinge between a closed configuration in which the first end of the first clamp arm and the third end of the second clamp arm are separated by a first distance, and an open configuration in which the first end of the first clamp arm and the third end of the second clamp arm are separated by a second distance greater than the first distance. The hinge movably joins the first clamp arm to the second clamp arm, and the non-contact sensor is configured to detect whether the clamp is in the closed configuration or the open configuration.

In some embodiments, the hinge may be a pin hinge.

In some embodiments, the clamp may further include a threaded shoulder swing bolt mounted to the first end of the first clamp arm.

In some embodiments, the threaded shoulder swing bolt may be configured to rotate about another hinge disposed on the first end of the first clamp arm such that it may fit into a notch of the third end of the second clamp arm to secure the first end of the first clamp arm to the third end of the second clamp arm.

In some embodiments, the clamp may further include a threaded wing nut configured to thread onto the threaded shoulder swing bolt, such that it may be tightened to secure the first end of the first clamp arm to the third end of the second clamp arm.

In some embodiments, the non-contact sensor may be spaced from the third end of the second clamp arm in the closed configuration.

In some embodiments, the first clamp arm and the second clamp arm may define an approximately circular shape when in the closed configuration.

In some embodiments, each of the first clamp arm and the second clamp arm may include an internal groove configured to fit over flanges being joined together by the clamp.

In some embodiments, the clamp may be constructed out of stainless steel.

In some embodiments, the clamp may be able to withstand exposure to high temperatures, high pressure, aggressive chemicals, or any combination thereof.

In some embodiments, the non-contact sensor may be configured to detect a position of the third end of the second clamp arm with respect to the first end of the first clamp arm. In some embodiments, the non-contact sensor may be further configured to transmit the detected position to a remote device. Additionally or alternatively, in some embodiments, a safety mechanism may be triggered in response to the detection of the position by the non-contact sensor.

In some embodiments, the non-contact sensor comprises at least one of an inductive sensor, an optical sensor, a capacitive sensor, a photoelectric sensor, a radio-frequency identification (RFID) sensor, and strain gauge load cells on the hinge.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF THE FIGURES

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

The techniques described herein generally relate to clamps. In some embodiments, the techniques relate to clamps that can be used to join or secure fittings, such as three-piece fittings. A three-piece fitting may include two flanged (e.g., Ferrule) ends (e.g., one flanged end on a single pipe, and another flanged end on a split or y-pipe). To join the two flanged ends, a gasket is required to be placed between the flanges, and a clamp can be secured around the two flanges (Ferrule) to join the two flanged ends. The clamps described herein can be sanitary clamps that can be used for position sensing and/or safety interlock, as discussed further herein.

It can be desirable to include a mechanism on a clamp to sense whether the clamp is fully closed (or not). Mechanical switches could be utilized to mechanically sense whether a clamp is closed. However, mechanical switches pose a number of problems, including breakability, residue build-up, and an inability to be cleaned. Many hygienic industries, including pharmaceuticals, food, and beverage manufacturers, may require the ability to clean or autoclave their clamps between batches or products. This requires exposing the clamps to liquids, chemicals, high temperature and/or pressure. The clamp described herein has been designed to meet these specifications and requirements.

The inventor has recognized such problems with conventional clamps. In order to solve these problems, the inventor has developed a hygienic clamp for position sensing that can be provided for safety interlock.

The clamp comprises an integrated non-contact sensor for determining whether the clamp is open or closed. The non-contact sensor can sense whether the clamp is closed by detecting the proximity of one arm of the clamp to its other arm, without requiring the two arms to contact one another. In particular, since the non-contact sensor is not mechanical, use of the clamp does not cause mechanical wear to the non-contact sensor. Additionally, the non-contact sensor can be constructed to prevent contaminant build-up on and/or around the sensor that can occur with and/or affect other types of sensors (e.g., for mechanically-actuated clamps).

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1A:
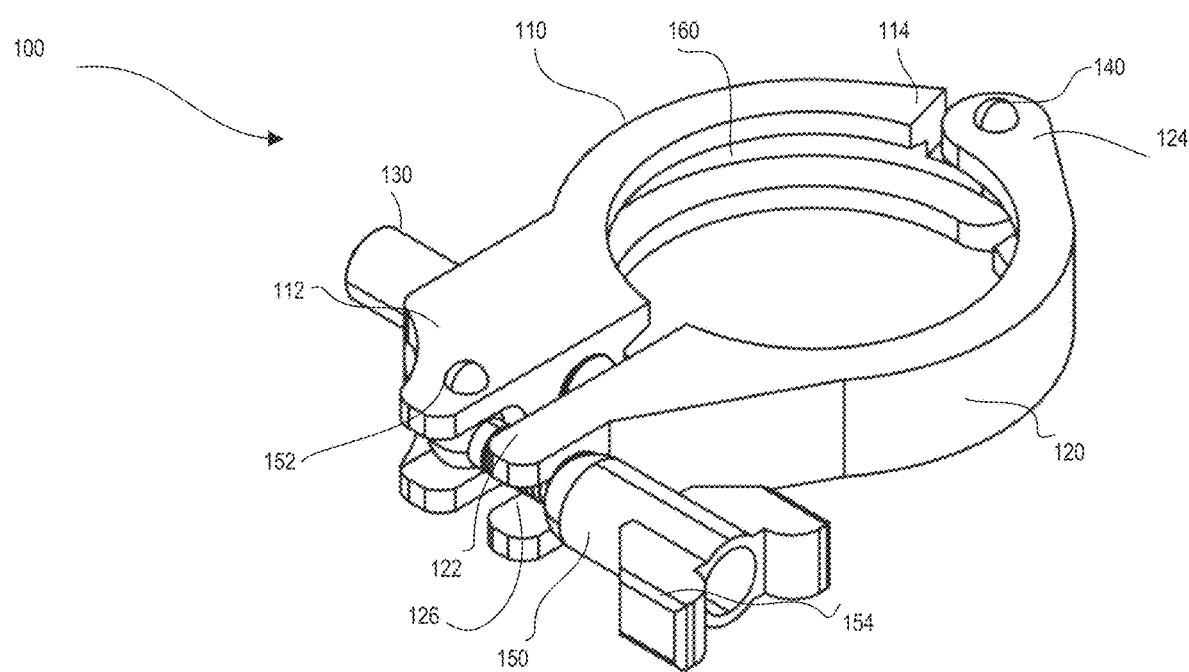
FIG. 1A is a view of an exemplary clamp with a non-contact sensor, viewed from the perspective of an angle to the plane in which the clamp lies and with the clamp is in a closed configuration, according to some embodiments.
Figure 1B:
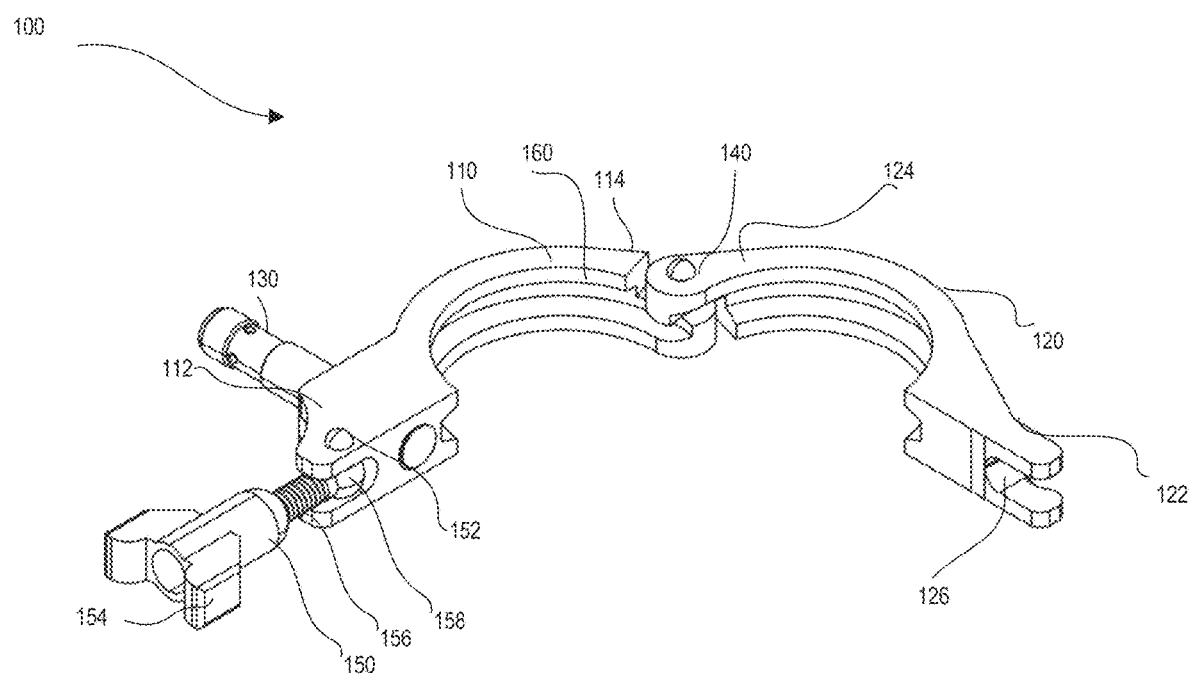
FIG. 1B is a view of the exemplary clamp of FIG. 1A from a similar perspective to that shown in FIG. 1A but with the clamp in an open configuration, according to some embodiments.
Figure 1C:
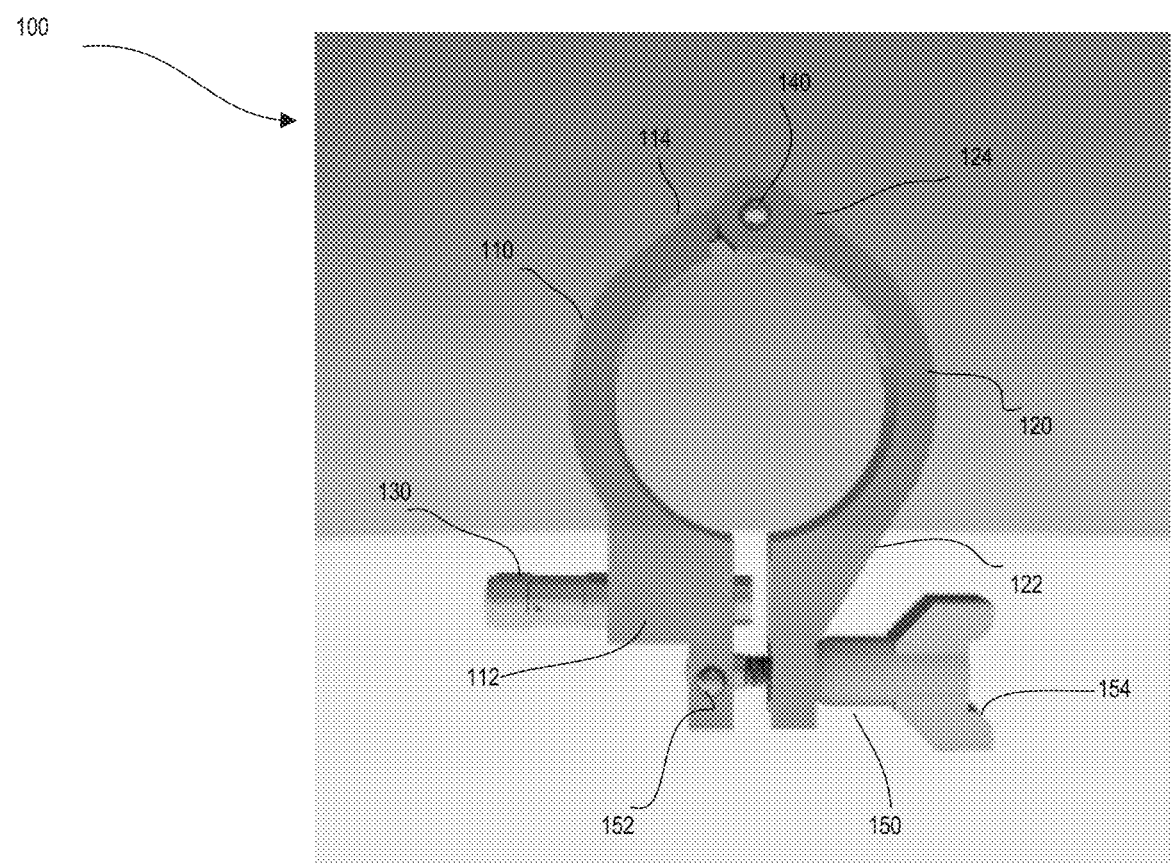
FIG. 1C is a view of the exemplary clamp of FIGS. 1A-1B from the perspective of looking down on the plane in which the clamp lies and with the clamp in a closed configuration, according to some embodiments.

FIGS. 1A-C illustrate numerous perspectives of a clamp with a non-contact sensor, according to some embodiments. FIG. 1A is a view of an exemplary clamp 100 with a non-contact sensor 130, viewed from the perspective of an angle to the plane in which clamp 100 lies and with clamp 100 in a closed configuration, according to some embodiments. FIG. 1B is a view of the exemplary clamp 100 of FIG. 1A from a similar perspective to that shown in FIG. 1A but with clamp 100 in an open configuration, according to some embodiments.

Clamp 100 includes a first clamp arm 110 and a second clamp arm 120. First clamp arm 110 has a first end 112 and a second end 114. Second clamp arm 120 has a third end 122 and a fourth end 124.

In the closed configuration of clamp 100 illustrated in FIG. 1A, first end 112 of first clamp arm 110 is separated from third end 122 of second clamp arm 120 by a minimal distance. The value of this minimal distance will vary with gasket type. In some embodiments, first clamp arm 110 and second clamp arm 120 define an approximately circular shape when clamp 100 is in a closed configuration.

In some embodiments, when clamp 100 is in a closed configuration, third end 122 is removably joined to first end 112 via a threaded shoulder swing bolt 150. Threaded shoulder swing bolt 150 may be constructed of Nitronic 60 material in order to prevent galling of the stainless steel threads of threaded shoulder swing bolt 150 from aggressive cleaning agents. Threaded shoulder swing bolt 150 may be connected to first end 112 via hinge 152, about which threaded shoulder swing bolt 150 is configured to rotate. In some embodiments, hinge 152 may be a pin hinge. In some embodiments, when clamp 100 is in a closed configuration, threaded shoulder swing bolt 150 may be rotated with respect to hinge 152 such that it fits into a notch 126 of third end 122 in order to secure first end 112 to third end 122.

In some embodiments, threaded shoulder swing bolt 150 includes a threaded wing nut 154, affixed to the end of threaded shoulder swing bolt 150. Threaded wing nut 154 is configured to thread onto (or off of) threaded shoulder swing bolt 150 such that it may be tightened to secure first end 112 to third end 122 (or loosened to unsecure first end 112 from third end 122).

Meanwhile, in the open configuration of clamp 100 illustrated in FIG. 1B, first end 112 is separated from third end 122 by a distance greater than the minimal distance by which the two ends are separated in a closed configuration. As shown in FIG. 1B, in an open configuration, threaded shoulder swing bolt 150 may pivot with respect to hinge 152 so that it no longer joins first end 112 to third end 122. FIG. 1B also provides a view of additional components of threaded shoulder swing bolt 150, including screw 156 and screw head 158. Screw head 158 is positioned in an opening below hinge 152 and is fixedly attached to first end 112. Screw 156 serves to screw threaded shoulder swing bolt 150 in place when clamp 100 is in a closed configuration, so that first end 112 may be securely joined to third end 122.

Clamp 100 further includes a non-contact sensor 130, which is mounted in first end 112 of first clamp arm 110. In some embodiments, non-contact sensor 130 may be an inductive sensor. In some embodiments, non-contact sensor 130 may be an optical sensor. In some embodiments, non-contact sensor 130 may be a capacitive sensor. In some embodiments, non-contact sensor 130 may be a photoelectric sensor. In some embodiments, non-contact sensor 130 may be a radio frequency identification (RFID) sensor. In some embodiments, non-contact sensor 130 may be strain gauge load cells on the hinge 152, used to determine if the clamp is torqued properly.

In some embodiments, non-contact sensor 130 is spaced from third end 122 when clamp 100 is in a closed configuration, such that it does not contact third end 122. In some embodiments, non-contact sensor 130 is configured to detect whether clamp 100 is in the closed configuration shown in FIG. 1A or the open configuration shown in FIG. 1B. As explained above, non-contact sensor 130 may detect the configuration of the clamp by detecting the proximity of second clamp arm 120 to first clamp arm 110 without touching second clamp arm 120.

The non-contact sensor 130 can be used to provide automatic feedback regarding the configuration of clamp 100, which can be stored and/or used to trigger subsequent action(s). In some embodiments, for example, when second clamp arm 120 is outside of the sensing range of non-contact sensor 130, non-contact sensor 130 can transmit a signal indicating the position of second clamp arm 120 to a remote device, such as a Process Linguistics Controller, or Safety Relay as examples. In some embodiments, non-contact sensor 130 may transmit the position information via positive negative positive (PNP) techniques as an example. In some embodiments, non-contact sensor 130 may transmit the position information via analog techniques which may be 4-20 mA, as an example.

The position information can indicate, for example, that the clamp is open and/or closed. Such position information can be used to provide interlocks and/or various indications such as, but not limited to, alarms and historical tracking of the position of the clamp during a process or batch. Interlocks can include, for example, tying the arm position to a valve for isolation and/or various other process actions. Interlocks can additionally or alternatively include a safety mechanism to initiate another process that is triggered in response to the clamp not being fully closed. It can be desirable to automate such remedial action, which can avoid loss of product or personal injury.

Clamp 100 further includes a hinge 140, which is adjacent to second end 114 of first clamp arm 110, and movably joins first clamp arm 110 to second clamp arm 120. In some embodiments, hinge 140 is a pin hinge.

In some embodiments, each of first clamp arm 110 and second clamp arm 120 have an internal groove 160. Internal groove 160 may be configured to fit over flanges that are being joined together by clamp 100, providing a compression in the connection of the flanges by clamp 100.

In some embodiments, non-contact sensor 130 and/or clamp 100 can be constructed of materials designed for certain applications, such as for hygienic applications. For example, non-contact sensor 130 and/or clamp 100 can be constructed out of stainless steel to allow for washdown and/or cleaning, such as Clean in Place (CIP) washdown where aggressive chemicals can be used for cleaning. In such embodiments, the threaded parts of non-contact sensor 130, clamp 100, and/or components thereof, such as threaded shoulder swing bolt 150, may be constructed of Nitronic 60 to prevent galling that would normally occur with stainless steel. In some embodiments, non-contact sensor 130 and/or clamp 100 can be constructed with a water and/or dust-tight design. In some embodiments, non-contact sensor 130 and/or clamp 100 can be constructed for chemical compatibility. In some embodiments, non-contact sensor 130 and/or clamp 100 can be constructed with high-temperature-rated components that are able to be washed (e.g., via a high-pressure washdown) and/or autoclaved, as necessary, depending on the particular application.

FIG. 1C is a view of the exemplary clamp 100 of FIGS. 1A-1B from the perspective of looking down on the plane in which clamp 100 lies and with clamp 100 in a closed configuration, according to some embodiments. FIG. 1C further illustrates certain notable features of clamp 100 while in a closed configuration, as described above. For example, in the exemplary embodiment illustrated in FIG. 1C, non-contact sensor 130 is spaced from third end 122 such that it does not contact third end 122, as described above. Furthermore, threaded shoulder swing bolt 150 is rotated with respect to hinge 152 such that it fits into notch 126 (not shown in figure) of third end 122 in order secure first end 112 to third end 122.

Figure 2A:
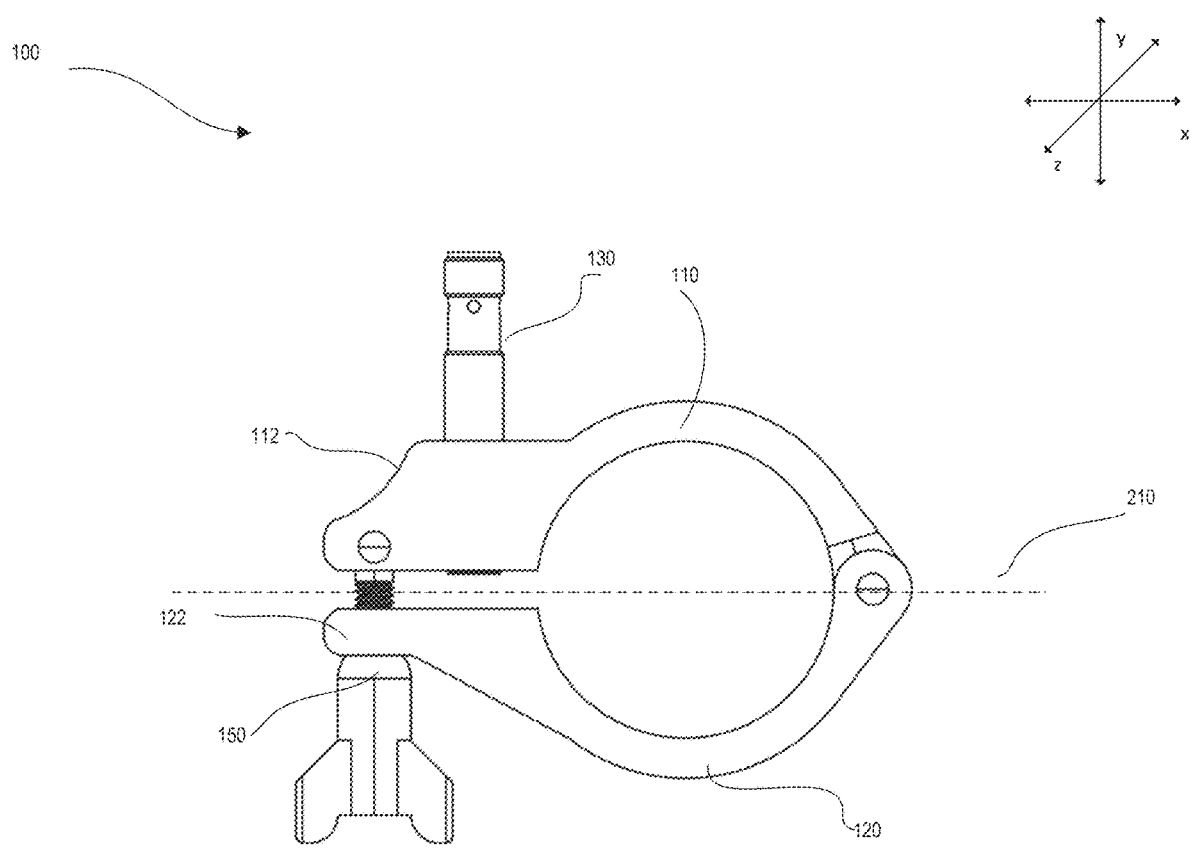
FIGS. 2A and 2B are line drawings of an exemplary clamp with a non-contact sensor, in which the clamp is in a closed configuration.
Figure 2B:
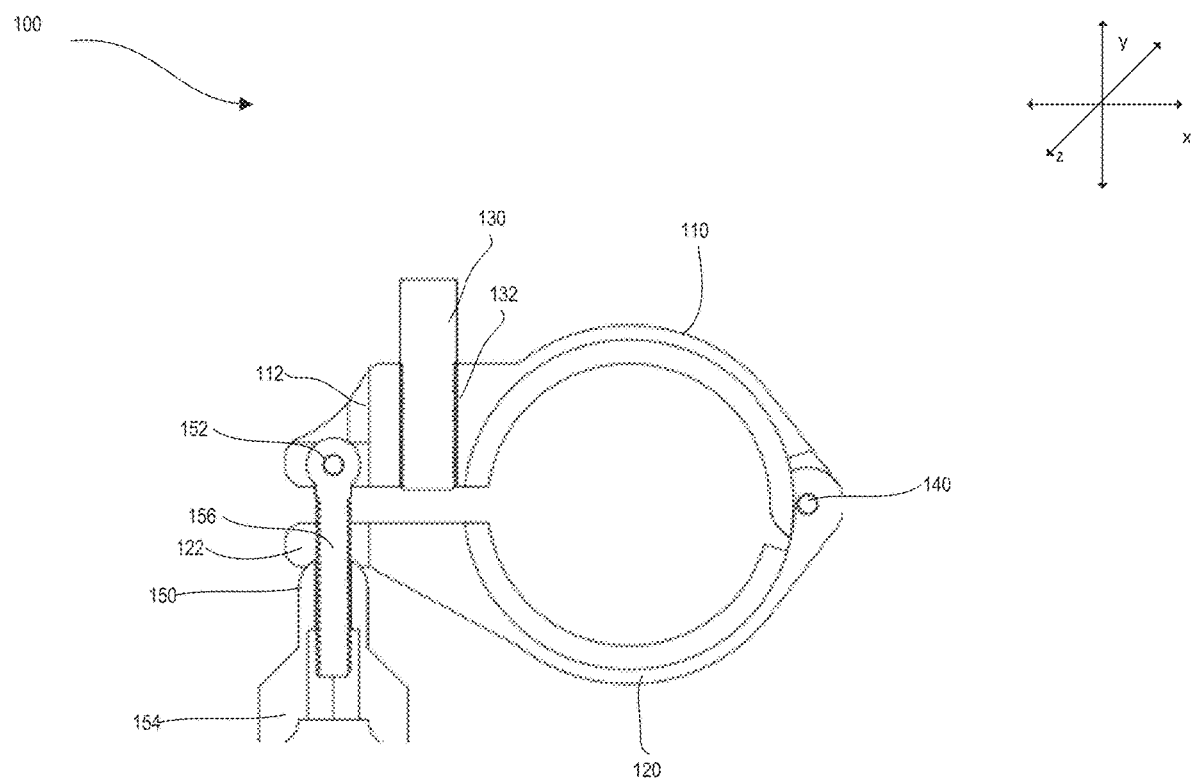
Figure 2C:
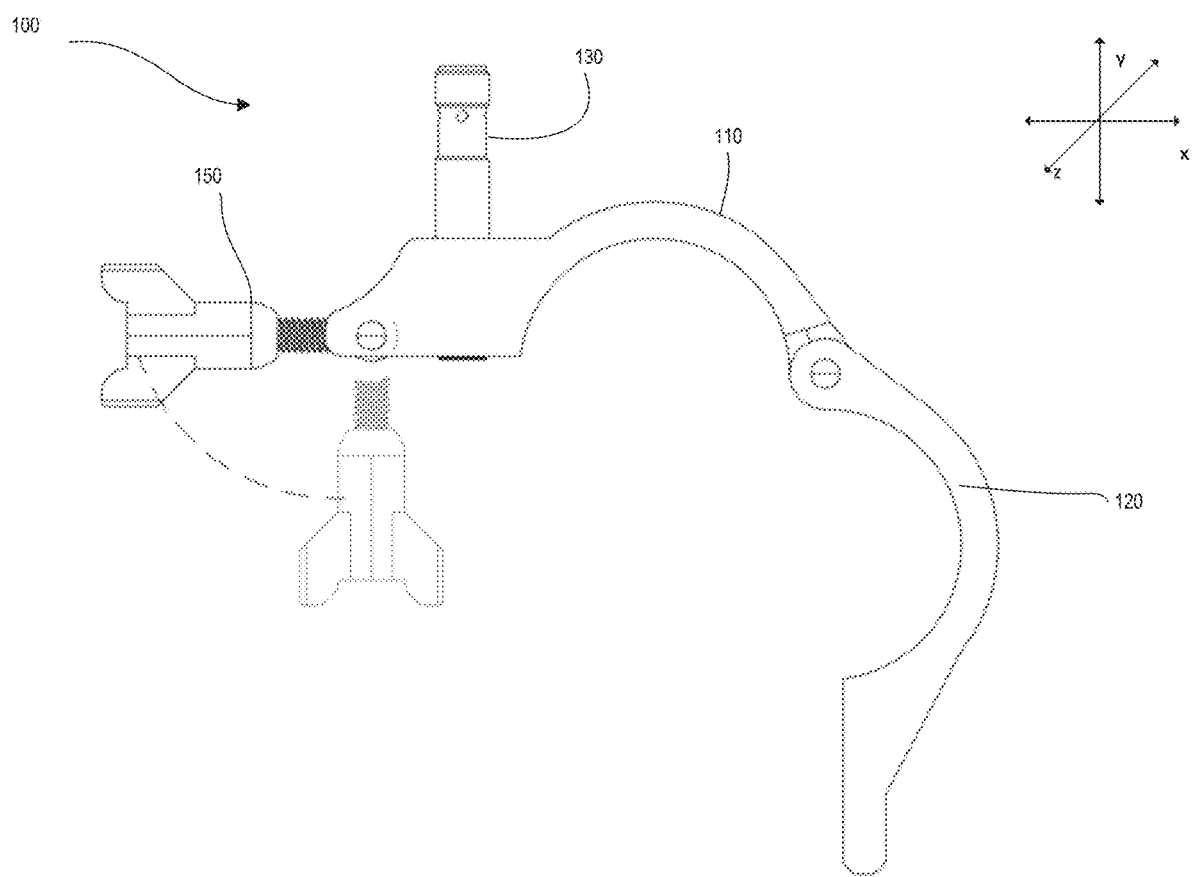
FIG. 2C is a line drawing of the clamp in which the clamp is in an open configuration.

FIGS. 2A-C are exemplary line drawings of the clamp 100 and non-contact sensor 130, according to some embodiments. FIG. 2A is a line drawing of an exemplary clamp 100 with a non-contact sensor 130, in which clamp 100 is in a closed configuration.

FIG. 2B is a line drawing of a cross-sectional view of the exemplary clamp 100 of FIG. 2A with non-contact sensor 130, in which clamp 100 is in a closed configuration, according to some embodiments. As shown in the cross-sectional view of FIG. 2B, non-contact sensor 130 includes mounting threads 132. Mounting threads 132 serve to help secure non-contact sensor 130 in first end 112. FIG. 2B also displays the threads of screw 156 extending through threaded shoulder swing bolt 150 and into third end 122 when clamp 100 is in the closed configuration. Additionally, FIG. 2B displays the interiors of hinges 140 and 152.

FIG. 2C is a line drawing of the clamp 100 in which clamp 100 is in an open configuration, according to some embodiments.

It should be appreciated that various dimensions of the components described and illustrated herein can be used in order to achieve the techniques described herein. For illustrative purposes, the following describes some non-limiting examples of component dimensions. However, it should be appreciated that these dimensions are provided for illustrative purposes only and are not intended to be limiting. One example embodiment of the clamp disclosed herein is the 2" version of the hygienic clamp. In this embodiment, the diameter of the circular shape formed by first clamp arm 110 and second clamp arm 120 is 2 and $\frac{3}{8}$ inches. In this embodiment, the distance between hinge 140 and the edge of the circular region formed by first clamp arm 110 and second clamp arm 120 that is across the center of the circular region is 2 and $\frac{11}{16}$ inches. In this embodiment, the distance between hinge 140 and the outer edges of both first end 112 and third end 122 is 4 and $\frac{3}{8}$ inches. In this embodiment, the distance from the center of threaded shoulder swing bolt 150 and both first end 112 and third end 122 is $\frac{3}{8}$ of an inch. In this embodiment, the distance by which first end 112 and second end 122 are separated when clamp 100 is in the closed configuration will vary with gasket type. In this embodiment, the thickness of each of first end 112 and second end 122 along the y-axis is $\frac{3}{8}$ of an inch. In this embodiment, the length of each of first end 112 and second end 122 along the x-axis is 1 and $\frac{1}{2}$ inches. In this embodiment, the distance along the x-axis from the center of non-contact sensor 130 to first end 112 is 1 and $\frac{3}{16}$ inches. In FIG. 2A, horizontal axis 210 is parallel to the x-axis and cuts directly through the center of the opening between first end 112 and third end 122 when clamp 100 is in the closed configuration. In this embodiment, the distance along the y-axis between horizontal axis 210 and the outer edge of either of first clamp arm 110 or second clamp arm 120 is 1 and $\frac{1}{2}$ inches.

In this embodiment, the thickness of each of first arm 110 and second arm 120 is $\frac{5}{16}$ of an inch. In this embodiment, the thickness of an inner surface of each of first arm 110 and second arm 120 is $\frac{3}{16}$ of an inch. In this embodiment, the thread size of threaded wing nut 154 is $\frac{5}{16}$". In particular, threaded wing nut 154 is of type $\frac{5}{16}$"-18. In this embodiment, the distance along the x-axis from the center of non-contact sensor 130 to the inner edge of the inner surface of each of first clamp arm 110 and second clamp arm 120 is $\frac{1}{2}$ of an inch. In this embodiment, the length along the y-axis from the end of screw 156 that touches threaded wing nut 154, to the center of screw head 158 is 1 and $\frac{3}{4}$ inches. In this embodiment, the distance along the y-axis from the point of attachment between screw 156 and screw head 158, and the far edge of first end 112, is 1 inch. In this embodiment, the distance along the x-axis from the center of threaded shoulder wing bolt 150 to the center of non-contact sensor 130 is 13/16 of an inch. In this embodiment, the distance along the x-axis between an edge and the center of non-contact sensor 130 is 5/16 of an inch, whereas the total width of non-contact sensor 130 along the x-axis is 12 mm.

In this embodiment, the length of third end 122 from the inner edge of the circular region formed by first arm 110 and second arm 120 to the outer edge of third end 122 is 1 and 11/16 inches. This length is aligned with the y-axis. This length is equal to the corresponding length of first end 112. In this embodiment, the distance along the x-axis between the center of non-contact sensor 130 and the outer edge of first end 112 is 1 and 3/16 inches.

The dimensions discussed above correspond only to the 2" version of the hygienic clamp and are not intended to be limiting. Therefore, it should be appreciated that any appropriate dimensions may be used as desired without departing from the spirit of the techniques described herein.

Figure 3:
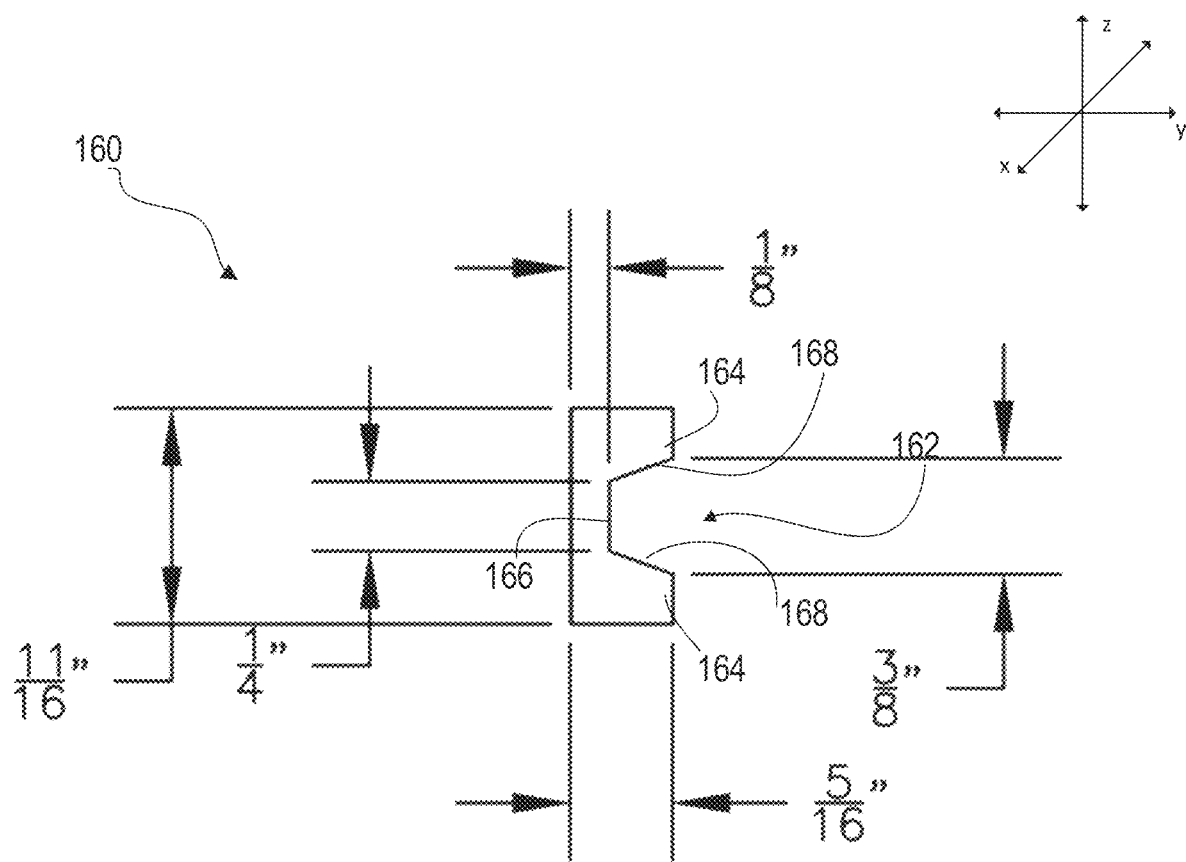
FIG. 3 illustrates a close-up perspective of the internal groove of the exemplary clamp, including the dimensions of various components, according to some embodiments.

FIG. 3 illustrates a close-up perspective of the internal groove 160 of the exemplary clamp 100, according to some embodiments. Specifically, it shows a cross-section of clamp 100 that slices through the clamp perpendicular to the direction along the circumference of the circular region formed by first arm 110 and second arm 120. Internal groove 160 includes cutout 162 and ridges 164. Cutout 162 further includes a flat portion 166, and two sloped portions 168, each of which connect one of the ridges 164 to flat portion 166.

FIG. 3 also shows the dimensions of various components of internal groove 160 in conjunction with the exemplary embodiment discussed above in which clamp 100 is a 2" version of the hygienic clamp. In this embodiment, the thickness of clamp 100 along the z-axis is 11/16 of an inch. In this exemplary embodiment, the thickness of flat portion 166 along the z-axis is ¼ of an inch. In this embodiment, the thickness of cutout 162, including flat portion 166 and sloped portions 168, along the z-axis is ⅜ of an inch. In this embodiment, the thickness of internal groove 160 along the y-axis is 5/16 of an inch. In this embodiment, the thickness of internal groove 160, excluding ridges 164, is ⅛ of an inch.

While FIG. 3 shows exemplary dimensions of various components of internal groove 160 of exemplary clamp 100, as noted above these dimensions are not intended to be limiting and are instead used merely for exemplary purposes. Therefore, it should be appreciated that any appropriate dimensions may be used as desired without departing from the spirit of the techniques described herein.

Figure 4:
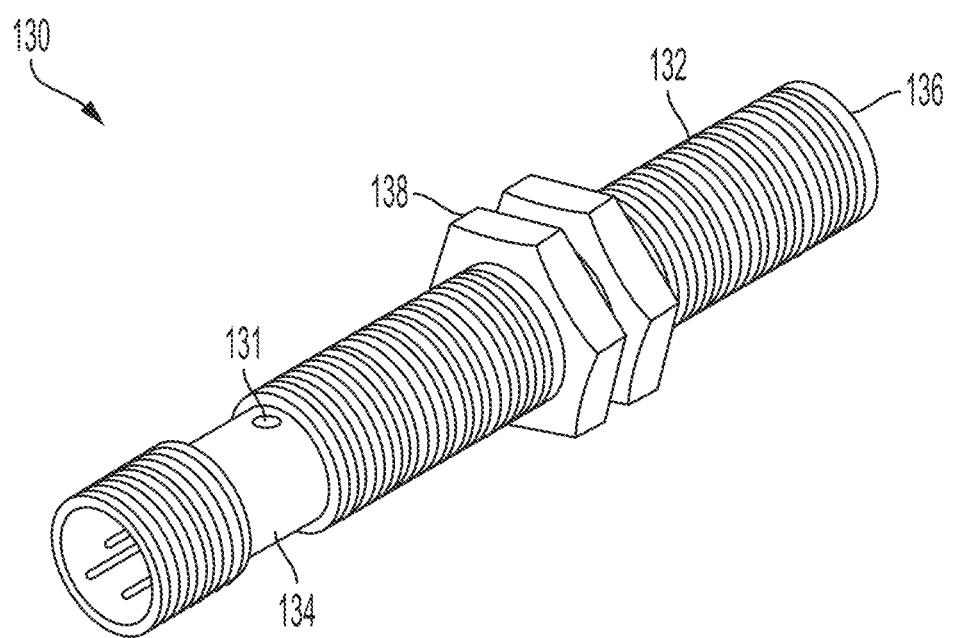
FIG. 4 illustrates a close-up perspective of an exemplary inductive sensor, according to some embodiments.

FIG. 4 illustrates a close-up perspective of a non-contact sensor 130, according to some embodiments. In the exemplary embodiment shown in FIG. 4, non-contact sensor 130 is an inductive sensor. Non-contact sensor 130 includes a sensing face 136. Sensing face 136 allows non-contact sensor 130 to detect the configuration of the clamp by detecting the proximity of second clamp arm 120 to first clamp arm 110 without touching second clamp arm 120, as described with respect to FIG. 1A above. Sensing face 136 may also allow non-contact sensor 130 to detect the position of second clamp arm 120, in the embodiments in which non-contact sensor 130 transmits the position of second clamp arm 120 to a remote device when second clamp arm 120 is outside of the sensing range of non-contact sensor 130, as described above with respect to FIG. 1A. In some embodiments, the body of non-contact sensor 130 may be constructed out of stainless steel, PEEK plastic, and/or PTFE. All of these materials of construction are acceptable in hygienic applications, in regard to temperature and chemical compatibility. However, these materials are merely exemplary materials from which non-contact sensor 130 may be constructed. These materials are not intended to be limiting. It should be appreciated that any appropriate materials may be used as desired without departing from the spirit of the techniques disclosed herein.

As shown in FIG. 4, the majority of the outer surface of non-contact sensor 130 is threaded with mounting threads 132, excluding a break 134 in mounting threads 132. As explained above with respect to FIG. 2B, mounting threads 132 serve to help secure non-contact sensor 130 in first end 112. Break 134 in mounting threads 132 serves to allow for positioning of a light-emitting diode (LED) 131 on the surface of non-contact sensor 130. In some embodiments, LED 131 may indicate the configuration of clamp 100 based on the configuration detected by sensing face 136. For example, LED 131 may turn on when sensing face 136 detects that clamp 100 is in a closed configuration. LED 131 may turn off when sensing face 136 detects that clamp 100 is in an open configuration.

In some embodiments, non-contact sensor 130 may not be threaded. In such embodiments, non-contact sensor 130 would be held in place with a set screw. Such a design may be beneficial in some contexts.

In some embodiments, non-contact sensor 130 may also include nuts 138, which engage with mounting threads 132. Nuts 138 may help to further secure non-contact sensor 130 in first end 112.

Figure 5A:
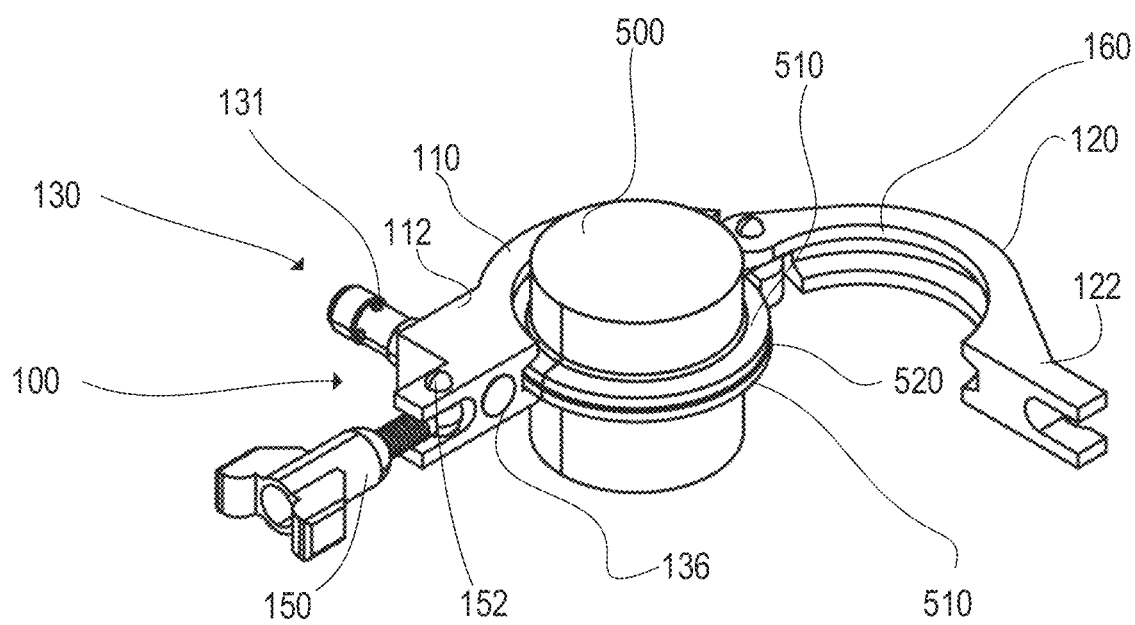
FIG. 5A is an exemplary illustration of the clamp mounted on a pipe while the clamp is in an open configuration, according to some embodiments.

FIG. 5A is an exemplary illustration of a clamp 100 mounted on a pipe 500 while clamp 100 is in an open configuration, according to some embodiments. Pipe 500 consists of a join at which there are two flanged ends, with a hygienic ferrule 510 on each end. Gasket 520 is in between hygienic ferrules 510. In some embodiments, as shown in FIG. 5A, internal groove 160 engages with hygienic ferrules 510 to secure clamp 100 to pipe 500. In the exemplary embodiment illustrated in FIG. 5A, since clamp 100 is in an open configuration, only the internal groove of first arm 110 engages the hygienic ferrules 510, while the internal groove of second arm 120 is unengaged. The exemplary embodiment illustrated in FIG. 5A also shows how, as described above in reference to FIG. 1B, when clamp 100 is in the open configuration, threaded shoulder swing bolt 150 may pivot with respect to hinge 152 so that it no longer joins first end 112 to third end 122. In the exemplary embodiment illustrated in FIG. 5A, sensing face 136 of non-contact sensor 130 may detect that clamp 100 is in an open configuration. As a result, LED 131 may turn off, or provide some other form of indication that clamp 100 is in an open configuration.

Figure 5B:
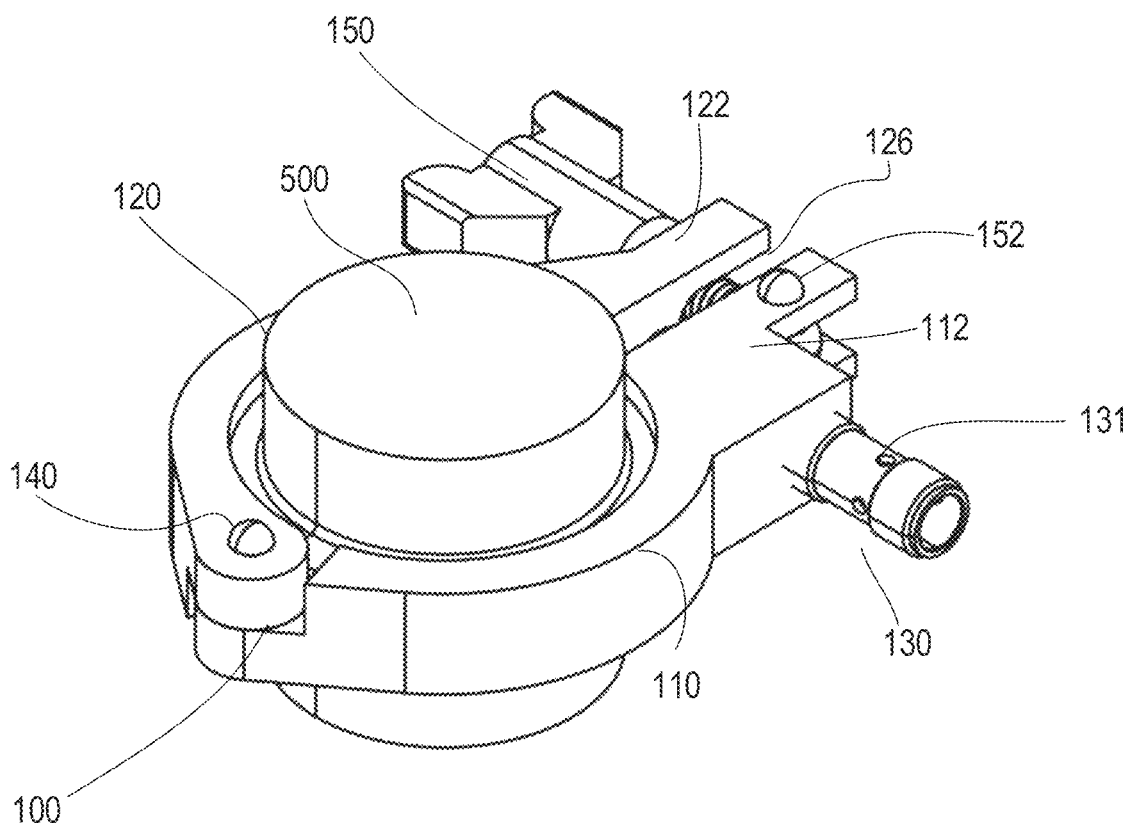
FIG. 5B is an exemplary illustration of the clamp mounted on a pipe while the clamp is in a closed configuration, according to some embodiments.

FIG. 5B is an exemplary illustration of clamp 100 mounted on pipe 500 while clamp 100 is in a closed configuration, according to some embodiments. Since clamp 100 is in a closed configuration, internal groove 160 (not shown in figure) of both first clamp arm 110 and second clamp arm 120 engage with hygienic ferrules 510 (not shown in figure) to secure clamp 100 to pipe 500. The exemplary embodiment illustrated in FIG. 5B shows how, as described above in reference to FIG. 1A, when clamp 100 is in a closed configuration, threaded shoulder swing bolt 150 may be rotated with respect to hinge 152 such that it fits into a notch 126 of third end 122 in order to secure first end 112 to third end 122. In the exemplary embodiment illustrated in FIG. 5B, sensing face 136 (not shown in figure) of non-contact sensor 130 may detect that clamp 100 is in a closed configuration. As a result, LED 131 may turn on, or provide some other form of indication that clamp 100 is in a closed configuration.

Figure 6:
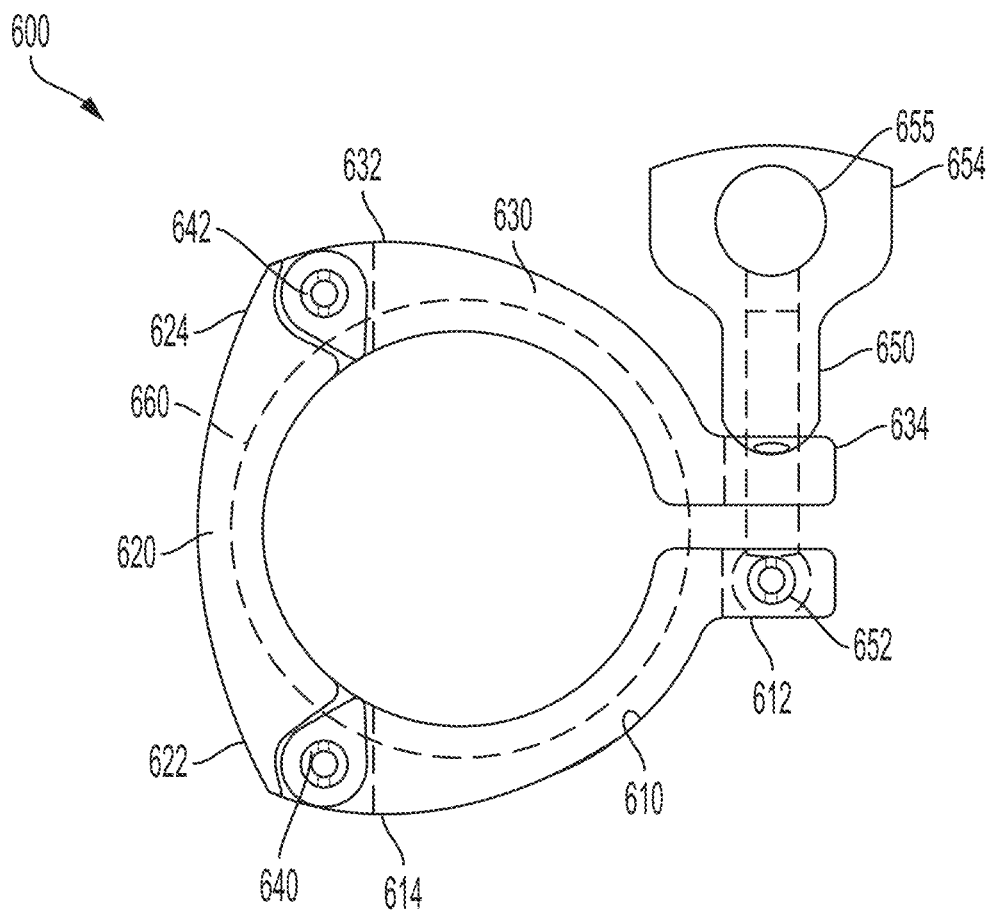
FIG. 6 is an exemplary illustration of a three-segment clamp, according to some embodiments.

While examples of the techniques described above were in conjunction with a two-segment clamp, it should be appreciated that various other configurations can be used to achieve the techniques described herein, such as three segment clamps, four segment clamps, and/or the like. FIG. 6 is an exemplary illustration of a three-segment clamp 600 in a closed configuration, according to some embodiments. Clamp 600 includes a first clamp segment 610, a second clamp segment 620, and a third clamp segment 630. First clamp segment 610 has a first end 612 and a second end 614. Second clamp segment 620 has a third end 622 and a fourth end 624. Third clamp segment 630 has a fifth end 632 and a sixth end 634.

In the closed configuration of clamp 600 illustrated in FIG. 6, first end 612 of first clamp segment 610 is separated from sixth end 634 of third clamp segment 630 by a minimal distance. The value of this minimal distance will vary with gasket type. In FIG. 6, the measure of this minimal distance is indicated by the measure "D". "D" may represent any suitable measure, as the techniques described herein are not limited in this respect. It should be appreciated that any appropriate measure for "D" may be used as desired without departing from the spirit of the techniques described herein.

In some embodiments, first clamp 610, second clamp segment 620, and third clamp segment 630 define an approximately circular shape when clamp 600 is in a closed configuration.

In some embodiments, when clamp 600 is in a closed configuration, sixth end 634 is removably joined to first end 612 via a threaded shoulder swing bolt 650. Threaded shoulder swing bolt 650 may be constructed of Nitronic 60 material in order to prevent galling of the stainless steel threads of threaded shoulder swing bolt 650 from aggressive cleaning agents. Threaded shoulder swing bolt 650 may be connected to first end 612 via hinge 652, about which threaded shoulder swing bolt 650 is configured to rotate. In some embodiments, hinge 652 may be a pin hinge. In some embodiments, when clamp 600 is in a closed configuration, threaded shoulder swing bolt 650 may be rotated with respect to hinge 652 such that it fits into a notch (not shown in figure) of sixth end 634 in order to secure first end 612 to sixth end 634.

In some embodiments, threaded shoulder swing bolt 650 includes a threaded wing nut 654, affixed to the end of threaded shoulder swing bolt 650. Threaded wing nut 654 may include hole 655. Threaded wing nut 654 is configured to thread onto (or off of) threaded shoulder swing bolt 650 such that it may be tightened to secure first end 612 to sixth end 634 (or loosened to unsecure first end 612 from sixth end 634).

In some embodiments, clamp 600 may utilize anoncontact sensor other than an inductive sensor (not shown in figure). The non-contact sensor may be mounted in first end 612 of first clamp segment 610. In some embodiments, the non-contact sensor may be an inductive sensor. In some embodiments, the non-contact sensor may be an optical sensor. In some embodiments, the non-contact sensor may be a capacitive sensor. In some embodiments, the noncontact sensor may be a photoelectric sensor. In some embodiments, the non-contact sensor may be a radio frequency identification (RFID) sensor. In some embodiments, the non-contact sensor may be strain gauge load cells on the hinge 652, used to determine if the clamp is torqued properly.

In some embodiments, the non-contact sensor is spaced from sixth end 634 when clamp 600 is in a closed configuration, such that it does not contact sixth end 634. In some embodiments, the non-contact sensor is configured to detect whether clamp 600 is in the closed configuration shown in FIG. 6 or, alternatively, in an open configuration. Similar to the non-contact sensor included in the two-segment clamp 100 described above, the non-contact sensor included in three-segment clamp 600 may detect the configuration of the clamp 600 by detecting the proximity of third clamp segment 630 to first clamp segment 610 without touching third clamp segment 630.

The non-contact sensor included in three-segment clamp 600 can be used to provide automatic feedback regarding the configuration of clamp 600, which can be stored and/or used to trigger subsequent action(s). In some embodiments, for example, when third clamp segment 630 is outside of the sensing range of the non-contact sensor, the non-contact sensor can transmit a signal indicating the position of third clamp segment 630 to a remote device, as discussed herein. In some embodiments, an adjustable spacer plate may be positioned between first end 612 and sixth end 634 (not shown in figure). The adjustable spacer plate may be rotatable. This addition of an adjustable spacer plate can allow for the gap between first end 612 and sixth end 634 to be kept constant (e.g., regardless of how much threaded wing nut is tightened and/or regardless of how compressible the gasket material is).

The position information can indicate, for example, that the clamp is open and/or closed. Such position information can be used to provide interlocks and/or various indications, as discussed herein.

Clamp 600 further includes hinges 640 and 642. Hinge 640 is adjacent to second end 614 of first clamp segment 610, and movably joins first clamp segment 610 to second clamp segment 620. Hinge 642 is adjacent to fourth end 624 of second clamp segment 620, and movably joins second clamp segment 620 to third clamp segment 630. In some embodiments, hinges 640 and 642 are pin hinges.

In some embodiments, each of first clamp segment 610, second clamp segment 620, and third clamp segment 630 have an internal groove 660. Internal groove 660 may be configured to fit over flanges that are being joined together by clamp 600, providing a compression in the connection of the flanges by clamp 600. In FIG. 6, the diameter of internal groove 660 is indicated by the measure "A". "A" may represent any suitable measure, as the techniques described herein are not limited in this respect. It should be appreciated that any appropriate measure for "A" may be used as desired without departing from the spirit of the techniques described herein.

In some embodiments, the non-contact sensor and/or clamp 600 can be constructed of materials designed for certain applications, such as for hygienic applications. For example, the non-contact sensor and/or clamp 600 can be constructed out of stainless steel to allow for washdown and/or cleaning, such as Clean in Place (CIP) washdown where aggressive chemicals can be used for cleaning. In such embodiments, the threaded parts of the non-contact sensor, clamp 600, and/or components thereof, such as threaded shoulder swing bolt 650, may be constructed of Nitronic 60 to prevent galling that would normally occur with stainless steel. In some embodiments, the non-contact sensor and/or clamp 600 can be constructed with a water and/or dust-tight design. In some embodiments, the non-contact sensor and/or clamp 600 can be constructed for chemical compatibility. In some embodiments, the noncontact sensor and/or clamp 600 can be constructed with high-temperature-rated components that are able to be washed (e.g., via a high-pressure washdown) and/or autoclaved, as necessary, depending on the particular application.

It is to be understood that the disclosed subject matter is not limited in its application to the details of construction and to the arrangements of the components set forth in the foregoing description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the description provided herein be regarded as including such equivalent constructions insofar as they do not depart from the spirit and scope of the disclosed subject matter.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter.

The invention claimed is:

1. A clamp, comprising:
   a first clamp arm with a first end and a second end, wherein:
      the first end comprises a non-contact sensor, wherein the non-contact sensor is mounted in the first end of the first clamp arm such that the non-contact sensor is secured in, and surrounded by, the first end of the first clamp arm; and
      the second end is proximate to a hinge; and
   a second clamp arm with a third end and a fourth end, wherein:
      the third end can be removably joined to the first end;
      the fourth end is proximate to the hinge such that the first clamp arm and the second clamp arm can move with respect to each other by the hinge between a closed configuration in which the first end of the first clamp arm and the third end of the second clamp arm are separated by a first distance, and an open configuration in which the first end of the first clamp arm and the third end of the second clamp arm are separated by a second distance greater than the first distance;
      the hinge movably joins the first clamp arm to the second clamp arm; and
      the non-contact sensor is configured to detect whether the clamp is in the closed configuration or the open configuration.

2. The clamp of claim 1, wherein the hinge is a pin hinge.

3. The clamp of claim 1, further comprising a threaded shoulder swing bolt mounted to the first end of the first clamp arm.

4. The clamp of claim 3, wherein the threaded shoulder swing bolt is configured to rotate about a hinge disposed on the first end of the first clamp arm such that the threaded shoulder swing bolt may fit into a notch of the third end of the second clamp arm to secure the first end of the first clamp arm to the third end of the second clamp arm.

5. The clamp of claim 4, further comprising a threaded wing nut configured to thread onto the threaded shoulder swing bolt, such that the threaded wing nut may be tightened to secure the first end of the first clamp arm to the third end of the second clamp arm.

6. The clamp of claim 1, wherein the non-contact sensor is spaced from the third end of the second clamp arm in the closed configuration.

7. The clamp of claim 1, wherein the first clamp arm and the second clamp arm define an approximately circular shape when in the closed configuration.

8. The clamp of claim 1, wherein each of the first clamp arm and the second clamp arm comprises an internal groove configured to fit over flanges being joined together by the clamp.

9. The clamp of claim 1, wherein the clamp is constructed out of stainless steel.

10. The clamp of claim 1, wherein the first and second clamp arms, the hinge, and the non-contact sensor are constructed to withstand exposure to high temperatures, high pressure, aggressive chemicals, or any combination thereof.

11. The clamp of claim 1, wherein the non-contact sensor is configured to detect a position of the third end of the second clamp arm with respect to the first end of the first clamp arm.

12. The clamp of claim 11, wherein the non-contact sensor is further configured to transmit the detected position to a remote device.

13. The clamp of claim 11, wherein a safety mechanism is triggered in response to the detection of the position by the non-contact sensor.

14. The clamp of claim 1, wherein the non-contact sensor comprises at least one of an inductive sensor, an optical sensor, a capacitive sensor, a photoelectric sensor, a radio-frequency identification (RFID) sensor, and strain gauge load cells on the hinge.

15. The clamp of claim 1, wherein the non-contact sensor comprises at least one mounting thread, wherein the at least one mounting thread is threaded into the first end to secure the non-contact sensor in the first end.

16. The clamp of claim 1, wherein the non-contact sensor comprises a fifth end and a sixth end opposite the first end.

17. The clamp of claim 16, wherein the fifth end of the non-contact sensor is disposed along an inner edge of the first end of the first clamp arm so the non-contact sensor is configured to detect whether the clamp is in the closed configuration or the open configuration, and wherein the sixth end of the non-contact sensor extends beyond an outer edge of the first end of the first clamp arm.

18. A clamp, comprising:
   a first clamp arm with a first end and a second end, wherein the first end comprises a non-contact sensor, and wherein the non-contact sensor is mounted in the first end of the first clamp arm such that the non-contact sensor is secured in, and surrounded by, the first end of the first clamp arm; and a second clamp arm with a third end and a fourth end, wherein the third end can be removably joined to the first end;

wherein:

the second end and fourth end are proximate to at least one hinge such that the first clamp arm and the second clamp arm can move with respect to each other by the at least one hinge between a closed configuration in which the first end of the first clamp arm and the third end of the second clamp arm are separated by a first distance, and an open configuration in which the first end of the first clamp arm and the third end of the second clamp arm are separated by a second distance greater than the first distance; and the non-contact sensor is configured to detect whether the clamp is in the closed configuration or the open configuration.

19. The clamp of claim 18, wherein:

the second end of the first clamp arm is proximate to a hinge;

the fourth end of the second clamp arm is proximate to the hinge; and the hinge movably joins the first clamp arm to the second clamp arm.

20. The clamp of claim 18, further comprising:

a third clamp arm with a fifth end and a sixth end, wherein:

the fifth end is proximate to a first hinge; and the sixth end is proximate to a second hinge;

wherein:

the second end of the first clamp arm is proximate to the first hinge; and the fourth end of the second clamp arm is proximate to the second hinge.

* * * * *